July 31, 1934.  W. A. LOTH  1,968,085
SYSTEM OF NAVIGATION AND PLANT FOR CARRYING IT OUT
Filed July 16, 1926    2 Sheets-Sheet 1

W. A. Loth
INVENTOR

July 31, 1934.  W. A. LOTH  1,968,085
SYSTEM OF NAVIGATION AND PLANT FOR CARRYING IT OUT
Filed July 16, 1926   2 Sheets-Sheet 2
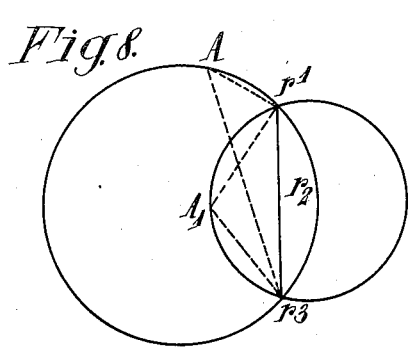
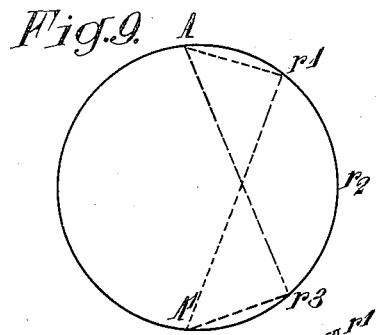
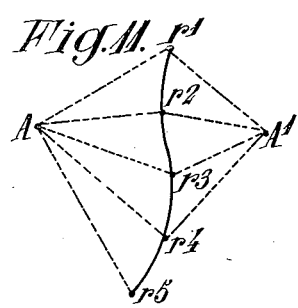
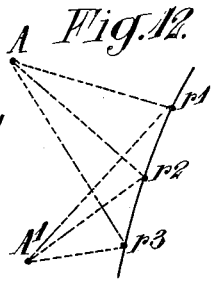
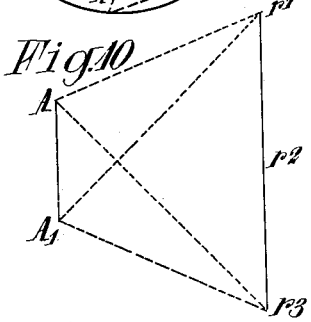
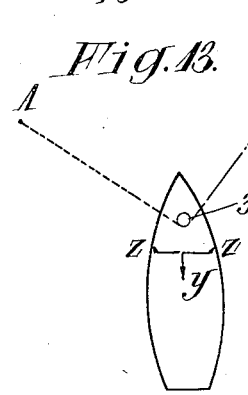
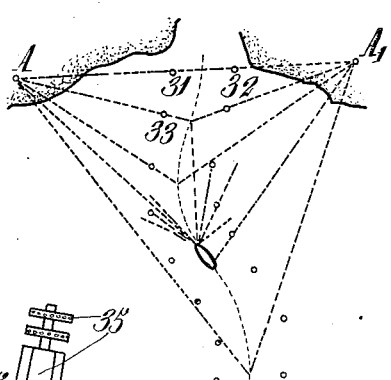
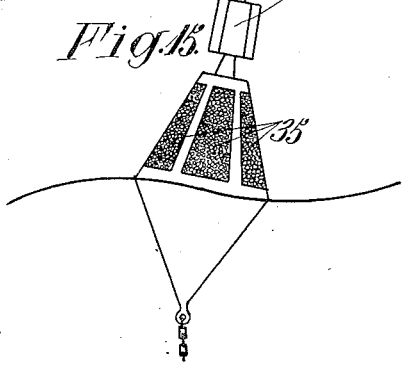
W. A. Loth
INVENTOR
By Marks & Clerk
Attys Patented July 31, 1934

1,968,085

UNITED STATES PATENT OFFICE 1,968,085

SYSTEM OF NAVIGATION AND PLANT FOR CARRYING IT OUT

William Arthur Loth, Paris, France, assignor to Société Industrielle des Procédés, W. A. Loth, Paris, France, a company of France Application July 16, 1926, Serial No. 122,966
In France July 18, 1925

10 Claims. (Cl. 250—2)

In my co-pending application Serial No. 12,144, filed February 27, 1925, now Patent No. 1,615,712, patented January 25, 1927, the invention described is a system of navigation in which each portion of the route to be followed is defined by the actual intersections of two directed or orientated tracing emissions. These tracing emissions are produced by transmitting stations situated at fixed points relative to the route, and may be either rotating or oscillating. In either event, the two tracing emissions are so controlled with respect to each other that their actual intersections trace the route. These emissions will therefore be simultaneously received on board a movable object located exactly on the route.

The present invention relates to improvements upon the invention of Patent No. 1,615,712. These improvements relate particularly to the tracing of the route to be followed by virtual crossings of the emissions rather than by actual crossings as in said Patent No. 1,615,712.

In the patented system, the displacement between the two emissions is null at any point on the route, and hence their actual intersections trace the route. According to the present invention, the two emissions are displaced in time, and hence the route must be traced by virtual rather than actual intersections. In order to have the desired virtual intersections, the two emissions must be so related that should the displacement between them be made null, without other change in the emissions, their actual intersections would trace the route to be followed. In both the patented system and the improvements of this invention, therefore, the general law of the tracing emissions is that the two emissions whose intersections, actual or virtual, define the route, must each trace the route in the same length of time and at the same linear speed along the route. The angular velocities of the two emissions may, however, as set forth in the said patent and hereinafter, be the same or different, depending upon the locations of the stations with respect to the route, etc.

Figures 3 to 10 inclusive illustrate diagrammatically various geometrical arrangements for tracing routes;

Figures 11 and 12 are diagrams illustrating the marking of routes by fixed stations, each emitting a plurality of separate, directed, stationary bundles of rays.

Figure 13 illustrates diagrammatically the simultaneous reception on board a movable object such as a ship of the emissions of luminous tracing stations;

Figure 14 shows the marking of a route with buoys in combination with tracing stations; and Figure 15 illustrates a buoy which can be rendered luminous by reflection.

As stated above, in the system of Patent No. 1,615,712, the various points of the route which is to be followed by a movable object are determined by the actual crossings of directed tracing emissions. The two emissions must therefore be simultaneous, and must reach their maxima (of their minima) at the same instant of time at each point of the route. In other words, there is no displacement whatever in time between the emissions, but they must be rigidly tied together as disclosed in said patent.

In accordance with one of the modifications of the present invention, the two tracing emissions may, for example, be displaced by a known and constant time interval, which may be represented by $d$. Let us assume that a displacement $d'$ is noted on board a movable object between the receptions of the maxima (or the minima) of the two tracing emissions. If the movable object is situated exactly on the route traced, the observed displacement $d'$ will be equal to the known displacement $d$. If the movable object is to the right or to the left of the route traced, the displacement $d'$ noted on board the movable object between the maxima (or the minima) of reception of the two tracing emissions, will be greater or less than $d$.

The value of the difference between the observed displacement and the known constant displacement, that is to say, $d'-d$ or $d-d'$, will indicate the lateral distance between the movable object and the route to be followed.

Figure 1:
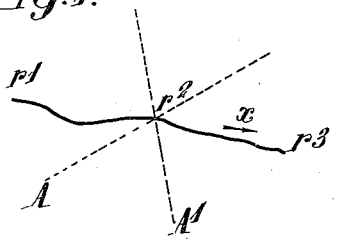
Figure 1 illustrates diagrammatically one method of tracing a route in accordance with the present invention.

Figure 1 gives an example of the route thus traced. In this figure, $r^1$, $r^2$ and $r^3$ indicate the route to be followed, and A and $A^1$ are the tracing stations. If the station $A^1$ is the first to trace the route, and the observed displacement $d'$ is greater than the known displacement $d$, the movable object is to the right of the route (the direction of displacement being that of the arrow $x$); but if $d'$ is less than $d$, the movable object is to the left. Of course, the route may be marked in miles or other units of length according to one of the modifications disclosed in my Patent No.

1,615,712. When the route is traced by tracing stations which emit directed or orientated electromagnetic waves, the system of this figure has the advantage of permitting reception by a single station on the movable object, which is tuned, successively, to each tracing emission.

According to another modification of the present invention, the route may be traced by emissions the displacement of which is unknown on board the vessel or movable object to be guided, and which displacement may be variable. That is to say, there is no rigorous connection between the two tracing emissions, except that, as in the systems of my prior patent and of Figure 1, the two emissions must each trace the route in the same length of time and at the same linear speed along the route. Thus, if we consider the direction of the maximum (or minimum) emission as a beam, each beam must take exactly the same length of time to move from the beginning of the route to any specified point thereon. In addition to the general law of the emissions stated above, the special law of this modification is that the time interval between the commencement of one emission and the moment when its beam reaches a given point on the route must be the same as the time interval between the commencement of the other emission and the moment that the beam of the latter reaches the same point on the route. This condition will necessarily follow, for example, if each beam is at the beginning of the route at the commencement of its emission.

In the system of this modification, it is of course not possible to use the displacement between the maxima (or the minima) of the two directed or orientated, rotating or oscillating tracing emissions to determine the location of the movable object, since this displacement is unknown and may be variable. Such emissions are received at the same instant of time at all points in space within their range, but have directional characteristics evidenced by a maximum or a minimum of intensity. It is, therefore, possible to note the moment when the emission begins, and the moment when its maximum (or minimum) is received, and thus to ascertain the time interval between the two. I therefore measure the period of time elapsing between the moment of commencement of the tracing emission of the first station, and the moment the reception of this emission becomes a maximum (or a minimum). The same period of time is then measured for the tracing emission of the second station. If the movable object is situated exactly on the route to be followed, these two measured time intervals must be equal, since the tracing emissions are so controlled that, for any point on the route, each emission requires the same length of time after its commencement to reach that point.

Figure 2:
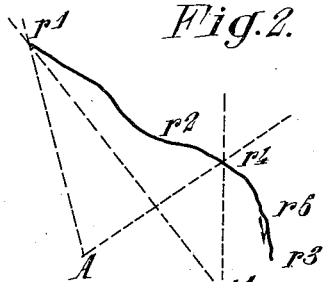
Figure 2 illustrates diagrammatically another method of tracing a route in accordance with this invention.

Figure 2 illustrates a route traced in the foregoing manner. In this figure A and $A^1$ are the two tracing stations, the virtual intersections of whose emissions define the route to be followed, and points $r^1$, $r^2$, etc., are points on the route.

Let $t_a$ be the moment at which the emission of station A commences;

$t_b$ be the moment at which the emission of station $A^1$ commences;

$t_a^1$ be the moment at which the maximum of the emission of station A is observed at point $r^1$, $t_a^2$ at point $r^2$, etc.;

$t_b^1$ be the moment at which the maximum of the emission of station $A^1$ is observed at point $r^1$, $t_b^2$ at point $r^2$, etc.

Then, since points $r^1$ and $r^2$ are on the route, by virtue of the special law of the emissions, $$t_a^1 - t_a = t_b^1 - t_b$$

Similarly, $$t_a^2 - t_a = t_b^2 - t_b$$

These equations man simply that for any point on the route the time difference $D_a$ noted on the moving object between the commencement of the emission of station A and the reception of its maximum (or minimum, as the case may be) will be equal to the time difference $D_b$ noted between the commencement of the emission of station $A^1$ and the reception of its maximum (or minimum). If these two time differences as noted on the moving object are not equal, therefore, it follows that the object is not on the route. If station A is the first to trace the route, and the observed time interval $D_b$ is greater than $D_a$, the movable object is on the right side of the route looking in the direction of the arrow in Figure 2. If $D_b$ is less than $D_a$, the movable object is on the left side of the route.

The value of the difference $D_b - D_a$ or $D_a - D_b$ will indicate the lateral distance between the movable object and the route to be followed.

The system of Figure 2 presents the advantage of permitting the utilization of a single receiving station (even in the case of tracings of routes by electromagnetic waves) and that of not necessitating any rigorous connection in the time, between the tracing stations, the movements of which are, nevertheless, rigorously subjected to particular characteristic and formal local laws. Of course, the measurements of the times $D_a^1$, $D_a^2$, etc. . $D_b^1$, $D_b^2$, etc. can be easily effected by means of watches having special clockworks and dials graduated in seconds and in kilometers or miles, in order to permit more easy and more rapid readings. It will be noted that if the movable object is exactly on the route, the characteristics of emission of two tracing stations determining the length of the route in kilometers or miles, must also both indicate the same kilometer or mile, at the time of the reception of the two maxima, or of the two minima of the emissions made from the tracing stations A and $A^1$. If the characteristics of emission are different at the time of the maxima or minima of reception, it is possible by taking as a basis the different number of kilometers or miles given by these characteristics of emission, to obtain the side on which the movable object is situated without taking into consideration the numerical value of the displacements or of the differences of time. It is however, preferable to simultaneously use the two modifications of reception which then mutually control each other and also the times elapsed between the beginnings of the tracing emissions and the reception of the maxima or minima measure the route in length. In the cases of the two modifications with known displacement and unknown displacement between the two tracing stations, the latter can also be placed on either side of the route to be traced, on a direction at right or other angles to the latter.

It will be seen that routes can be traced with either one of the modifications which have just been indicated, provided the particular movements at each tracing station (A, $A^1$) are such that if the displacement should become null, the crossing of the two tracing emissions would effectively trace the route to be followed by the movable objects as indicated in my Patent No. 1,615,712. Of course, the same stations can successively trace different routes.

After having shown the modifications caused by different utilizations of the time factor, whilst maintaining the same principle of the tracing of the routes, I shall now show the modifications necessitated by different utilizations of the space factor in the guiding system without cable along routes traced by stations, and how the movements and locations of said stations can be mathematically determined.

It is known that the local movements of rotation or oscillation of the tracing stations must be subordinated to the shape of the route which the real or virtual crossings of their simultaneous or displaced bundles must trace at a constant speed. The local movements of rotation or oscillation of the directed or orientated emitting tracing stations can, however, be sometimes simplified when it is possible to arrange the tracing stations on lines of geometrical figures such as straight lines, circles, parabolas, hyperbolas for instance.

Figure 3:
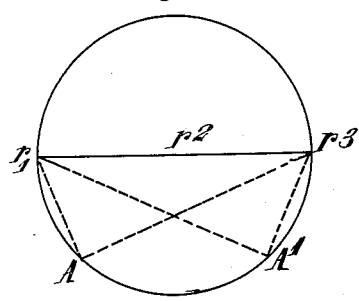

Fig. 3 shows, by way of example, two tracing stations A and $A^1$, placed on a circle, the route to be traced $r^1$; $r^2$, $r^3$ coinciding with the diameter. It will be seen that the two stations A and $A^1$ can trace the diameter $r^1$, $r^2$, $r^3$ by simultaneous orientated or directed, rotating or oscillating emissions, with a null displacement, or by successive, orientated rotating emissions, with a constant and known displacement, or again successive orientated or directed rotating emissions, with any unknown displacement, as indicated in the foregoing. The two tracing stations A and $A^1$ have original and terminal directions which pass through the ends $r^1$ and $r^3$ of the diameter. The crossing point of the tracing emissions, traces the diameter at a constant speed.

It will be noted that the angles described by the orientated or directed tracing bundles of the stations A and $A^1$ are, in the case considered, equal each being 90°. If the tracing stations A and $A^1$ are arranged on a direction parallel to the loxodromic $r^1$, $r^2$, $r^3$, the laws of their particular rotations are simplified. The same is true if, instead of tracing a straight route, an arc of large circle (orthodromy) is traced, the two tracing stations being placed on a direction parallel to the said straight line.

Figure 6:
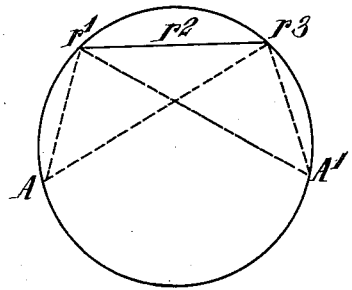
Figure 4:
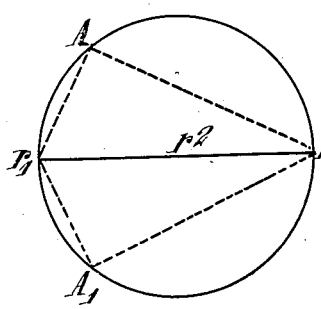
Figure 5:
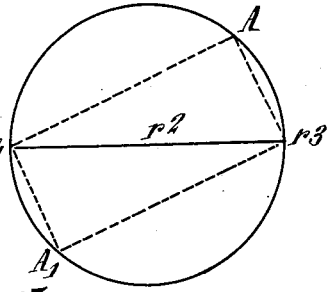
Figure 7:
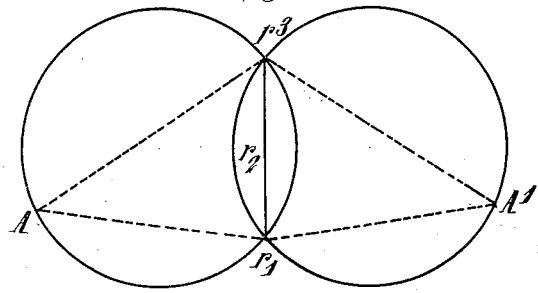

The laws of the local accelerations at A and $A^1$ are also simplified. Fig. 4 shows that the two tracing stations A and $A^1$ can be placed on either side of the routes $r^1$, $r^2$, $r^3$ to be traced. Figs. 4, 5 show also that the directions of the variations of the angular speeds at the two stations A and $A^1$ can be the same, or reverse. Fig. 6 shows that the route instead of being a diameter can be a chord $r^1$, $r^2$, $r^3$. In this case, the angles described by the tracing bundles whether displaced or not of the two stations A, $A^1$ are no longer equal, but supplementary. The segments are of course chosen for being capable of receiving the inscribed angles necessary for tracing the route. Fig. 7 shows that one of the tracing stations A can be placed on a point of a geometrical line and the other station $A^1$ on an identical or different line. The elementary straight line of the route can be the radical axis of two circular arcs which intersect, of two tangent circles or two circles, having no common point. In the case of Fig. 8, the tracing stations A, $A^1$ are placed, by way of example, on circles having different diameters. Fig. 9 shows that the route can be a geometrical line, the tracing stations A, $A^1$ may then be placed on identical or different lines. In the case of Fig. 9, arc $r^1$, $r^2$, $r^3$ of the circle has been chosen as a route. Finally, it will be noted that many complex routes can be divided into route elements capable of being subjected to the preceding rules of construction. The method of procedure indicated will be used for each element of any long route thus divided.

By studying the influence of the space factor upon the tracing of routes, the following result is found: the choice of the position of the straight line joining the tracing stations (to the number of two for instance) relatively to the route to be traced, leads to a simplification of the local movements of the tracing stations. In this particular case and considering the specially chosen positions of the tracing stations A, $A^1$, if the route to be followed is an arc of large circle for instance (here shown as a straight line $r^1$, $r^2$, $r^3$) and if the arc (here shown as a straight line A, $A^1$) joining the two tracing stations A, $A^1$ is parallel thereto (Fig. 10), the movement of each of the tracing emissions, happens to be a simplified movement. The common crossing point of said tracing emissions allows of tracing the route $r^1$, $r^2$, $r^3$ at the surface of the earth or of the sea an orthodromy is thus traced.

The tracing stations being thus arranged on a line parallel to the route to be traced and the movements of their rotating tracing emissions being, thus simplified, it is moreover possible to introduce between these emissions a known and constant displacement or any unknown displacement, according to one of the modifications of tracing which have just been indicated.

It will be seen that the principle of the tracing of routes remaining the same, it is possible by suitably modifying the time factor (known or unknown displacement), and the space factor (geometrical lines, judiciously chosen places) and with or without combining the displacements differences of time and locations, to simplify the connections of the tracing stations and the laws of rotation or oscillation of the tracing emissions. It is also known to be possible to trace routes by using luminous emissions, produced by light houses for instance. However, if a route is traced by two light houses spaced apart a great distance, the eyes cannot observe these two light houses simultaneously, considering the angle they determine. Now, if the tracing emissions do not use the virtual tracing by displaced emissions, it is necessary to simultaneously observe the two tracing light houses. It is obviously possible to use for that purpose any apparatus of the sextant type, but this is complicated. For the purpose indicated and in a more simple manner, an apparatus is then arranged on the movable object permitting to see the tracing lights or lighthouses. This may be done by reflection, or by reflection and refraction, by means of one eye only, or by means of both eyes, with common or separated vision. Fig. 13 diagrammatically illustrates, a means of construction of this apparatus. This means consists of a cylinder 30 internally silvered for instance. At a given instant, this cylinder reflects the light emissions of the two tracing stations A and $A^1$, in the direction of arrow $y$, where the observer is, on board the movable object. This cylinder 30 is, of course, protected against the action of the weather. If the movable object is not exactly on the route, a displacement exists between the passages of the two tracing emissions on the cylinder and their reflections in the direction of observation. This displacement can be taken up and appreciated on board the movable object, between the two light receptions, by looking at the reflecting cylinder 30 by means of a telescope, which may be moved in the direction of the arrows Z. Concerning the case of tracing stations giving light waves or infra-red waves, it is to be noted that, instead of employing two orientated or directed rotating tracing stations, it is possible to use fixed tracing stations A and $A^1$ each sending luminous or infra-red, or ultra-violet bundles, in directions $Ar^1$; $Ar^2$; $Ar^3$; $Ar^4$; etc. and $A^1r^1$; $A^1r^2$; $A^1r^3$; $A^1r^4$; etc. such that their crossing points determine, from place to place ($r^1$, $r^2$, $r^3$, $r^4$, etc.) the route to be followed (Fig. 11) whilst staking it out in length, that is to say by dividing it in kilometers or miles for instance from $r^1$ to $r^2$; from $r^2$ to $r^3$; from $r^3$ to $r^4$, etc. from a luminous crossing to another luminous crossing. This is impossible with waves having great wave lengths, sonorous waves for instance. The optical systems of the light houses A and $A^1$ are of course cut so as to permit the concentration of the separated bundles $Ar^1$, $A^1r^1$, etc. in different chosen directions about one and the same axis of emission, the projections of which is read at points A and $A^1$ (Fig. 11.

The optical systems can be replaced by suitable reflectors (gilded for instance), and Fig. 12 shows an example of route determined as just described, the two lighthouses being placed on the same side of the route $r^1$, $r^2$, $r^3$.

It is obvious that either one or both of the rotating or oscillating tracing light houses or the fixed light houses which have just been mentioned are provided with characteristics of emission realized by Morse signals for instance, or by colours, in order to characterize and differentiate the harbours and routes traced. These characteristics of emission can be realized by the tracing lights themselves, or by non directed lights for instance, combined with these orientated tracing lights. The staking out in length of the luminous route thus traced, can also be realized by colours, combinations of coloured lights, or Morse signals, varying for instance at each kilometer or mile traced.

Moreover the maritime or aerial routes traced by the orientated tracing emissions, can be materially realized from place to place by a system of buoys or stakes, placed at intervals, on these routes, these buoys or stakes being used in connection with the tracing, that is to say being put in action, when the orientated simultaneous or displaced emissions of the tracing stations pass through the points where they are on the route to be followed. These arrangements are of great interest. Thus for instance, if use is made of tracing light houses, buoys can be arranged, from place to place, on the route thus traced, these buoys having plane or curved, or wavy, simple or multiple reflecting surfaces which send back the lights of the tracing stations at the time the light rays, upon rotating, strike the said surfaces. These reflecting buoys or stakes can obviously mark out the route in kilometers or miles and carry reflectors with characteristics of emission. The peculiar points of the route traced (hands, etc.) can be determined by reflecting buoys of different shapes and characteristics. The same system of maritime or land buoys or stakes is, of course, applicable to aircraft, particularly if these buoys or stakes are provided, in addition to the reflection considered, with a zenithal reflection.

It will be noted that the reflecting buoys or stakes can give, either reflections in any variable directions, with variable incidence, or reflect only in a given direction; that of the channel to be followed, for instance. This device may be realized either by maintaining the buoys or stakes orientated in a fixed direction, or by leaving it free about its axis, but by orientating the optical system in the direction chosen. This latter form of realization may be obtained by causing the direction of the optical system to depend on the fixed direction of a magnetised pointer.

Furthermore it will be noted that the reflecting buoys and stakes used in combination with rotating or oscillating tracing light houses, or with fixed orientated bundles tracing a channel by crossing, displaced or not, can be found again and lighted by a rotating or fixed simple or double tracing projector, placed on board movable objects to be guided. Fig. 14 shows an example of a vessel moving in a real alley of reflecting points, this vessel carrying, at the front, a movable projector giving a narrow bundle and a projector giving a wider bundle 31, 32, 33 . . . are reflecting buoys or stakes lighted by means of tracing light houses A, $A^1$. Concerning the ships following these special channels, such differentiated reflecting systems placed at the front and at the rear may be used. These reflecting systems will thus be struck by the tracing light houses placed on land or on board the other vessels.

Fig. 15 shows, by way of example, a device of buoy or stake. Such a device may also be used with the fixed luminous system which has just been described. In Fig. 15, 35 designates plane or curved surfaces reflecting the lights. Use can also be made of silvered cylinders or silvered spheres, or of polygonal reflecting surfaces, etc. These luminous reflecting buoys may also be placed on either side of the route to be traced and which must be followed by the guided movable objects. Rocks placed near the traced route, may also be guarded in this manner.

Finally, it will be noted that after having traced the route, as just described, by means of the tracing stations, it is possible to impart to one or both of the light houses, any movements of rotation, oscillations in vertical or horizontal, or selected combined planes, which permit to light total reflection buoys, or provided with a reflector, which stake out the route to be followed. These light flashes realize a preliminary guiding of the movable object by signaling ahead the route it must follow.

What I claim as my invention and desire to secure by Letters Patent is:

1. In the art of guiding movable objects upon a predetermined course, the method which consists in emitting directed rays from two fixed stations, causing the said rays to move angularly, so that the rays from each station intersect at a given time the set course at different points, and coordinating the movements of the said rays so that they intersect the set course at any given point at two different instants, separated by a consant time interval.

2. In the art of guiding movable objects upon a predetermined course, the method which consists in emitting directed rays from two fixed stations, causing the said rays to move angularly, so that the rays from each station intersect at a given time the set course at different points, and coordinating the movements of the said rays so that they intersect the set course at any given point at two different instants, separated by a constant time interval, maintaining the said time interval invariable from day to day, and measuring at the movable object the difference in the time of reception in order to determine the lateral distance from the set course.

3. A method for tracing a course to guide an object along said course, said method comprising angularly moving a directed emission at each of two spaced points, each emission having a predetermined desired directional characteristic, the desired directional characteristics of said emissions intersecting said course at different points at any instant of time, and controlling the angular movement of each directed emission so that the points of intersection of the respective desired directional characteristics with said course travel along said course with the same speed characteristics from point to point.

4. A method for tracing a course to guide an object along said course, said method comprising angularly moving a directed emission at each of two spaced points, each emission having a predetermined desired directional characteristic, the desired directional characteristics of said emissions intersecting said course at different points at any instant of time, and controlling the angular movement of each directed emission so that the same time interval elapses between the instant of starting of each directed emission and the instant the desired directional characteristic of said emission intersects any selected point on said course.

5. A method for tracing a course to guide an object along said course, said method comprising angularly moving a directed emission at each of two spaced points, each emission having a predetermined desired directional characteristic, the desired directional characteristics of said emissions intersecting said course at different points at any instant of time, controlling the angular movement of each directed emission so that the same time interval elapses between the instant of starting of each directed emission and the instant the directional characteristic of said emission intersects any selected point on said course, noting at said object the time interval between the commencement of each emission and the instant of reception of its directional characteristic, and determining the position of said object with respect to said course by comparison of said time intervals.

6. A method for tracing a course to guide an object along said course, said method comprising angularly moving a directed emission at each of two spaced points, each emission having a predetermined desired directional characteristic, the desired directional characteristics of said emissions intersecting said course at different points at any instant of time, and controlling the angular movement of each directed emission so that the desired directional characteristic of one emission intersects each point on said course after the selected directional characteristic of the other emission intersects said points, the time interval between the two intersections at each point being a predetermined constant.

7. A method for tracing a course to guide an object along said course, said method comprising angularly moving a directed emission at each of two spaced points, each emission having a predetermined desired directional characteristic, the desired directional characteristics of said emissions intersecting said course at different points at any instant of time, controlling the angular movement of each directed emission so that the directional characteristic of one emission intersects each point on said course after the desired directional characteristic of the other emission intersects said points, the time interval between the two intersections at each point being a predetermined constant, noting at said object the time interval between the instants of reception of the directional characteristics of said emissions, and determining the position of said object with respect to said course by comparing said time interval with said predetermined constant.

8. A method for tracing a course to guide objects along said course, said method comprising angularly moving a radiated beam at each of two spaced points, said beams intersecting said course at different points at any instant of time, and controlling the angular movement of each beam so that the points of intersection of the respective beams with said course travel along said course with the same speed characteristics from point to point.

9. A method for tracing a course to guide an object along said course, said method comprising angularly moving a radiated beam at each of two spaced points, said points arranged so that they have a definite geometrical relationship with respect to each other and with respect to said course, said beams intersecting said course at different points at any instant of time, and controlling the angular movement of each beam so that the points of intersection of the respective beams with said course travel along said course from point to point with the same speed characteristics.

10. A method for tracing a course to guide an object along said course, said method comprising angularly moving a radiated beam at each of two spaced points, said points located on a line which is parallel to a line defining said course, said beams intersecting said course at different points at any instant of time, and controlling the angular movement of each beam so that the points of intersection of the respective beams with said course travel along said course from point to point with the same speed characteristics.

WILLIAM ARTHUR LOTH.